United States Patent [19]

Takita et al.

[11] Patent Number: 4,797,690

[45] Date of Patent: Jan. 10, 1989

[54] RIBBON FEED MECHANISM

[75] Inventors: Masaaki Takita, Ibaraki; Yoshikazu Tsuru, Hirakata; Masaharu Ushihara, Hirakata; Taichi Itoh, Hirakata; Masumi Tanaka, Yawata, all of Japan

[73] Assignee: Matsushita Electric Industrial Co., Ltd., Osaka, Japan

[21] Appl. No.: 162,409

[22] Filed: Feb. 29, 1988

[30] Foreign Application Priority Data

| | | | |
|---|---|---|---|
| Mar. 4, 1987 | [JP] | Japan | 62-49289 |
| Mar. 23, 1987 | [JP] | Japan | 62-68409 |
| May 8, 1987 | [JP] | Japan | 62-113020 |

[51] Int. Cl.[4] .............................................. G01D 15/00

[52] U.S. Cl. ...................................... 346/105; 400/234

[58] Field of Search .................. 346/105, 106, 76 PH, 346/76 R, 160.1; 400/223, 224.1, 224.2, 228, 234, 236, 236.1, 236.2, 400; 242/56.9, 75, 75.1, 75.43, 75.5, 75.2

[56] References Cited

U.S. PATENT DOCUMENTS 4,451,834 5/1984 Nakajima et al. .............. 346/76 PH 4,468,676 8/1984 Nakajima et al. .................... 346/105

*Primary Examiner*—Arthur G. Evans

*Attorney, Agent, or Firm*—Stevens, Davis, Miller & Mosher

[57] ABSTRACT

The present invention relates to a ribbon feed mechanism for use in a heat transfer printer. The ribbon feed mechanism includes first, second, and third ribbon feed components fitted on a shaft, a friction plate mounted between the first and second ribbon feed components, a spring mounted between the second and third ribbon feed components, a cylinder which is in contact with the third ribbon feed component at one end thereof, and a ribbon feed presser for pressing the other end of the cylinder toward the third ribbon feed component. The rotational torque is always kept constant, and therefore no unmatching of colors occurs when the mechanism is applied to a printer.

9 Claims, 8 Drawing Sheets

RIBBON FEED MECHANISM

BACKGROUND OF THE INVENTION

1. Field of the Invention

The present invention relates to a ribbon feed mechanism for use in a printer.

2. Description of the Prior Art

In recent years, heat transfer color printers have been used as computer aided design terminals or in computer graphics or video tape recording.

FIG. 1 is a perspective view of a heat transfer color printer. The heat transfer color printer includes: a lower cabinet 1; a circuit section 2; a power source panel 3; a pinch roller 4; a capstan roller 5 with which the pinch roller 4 makes contact to drive it; and a platen roller 6. The platen roller, the pinch roller 4, and the capstan roller 5 together form a paper feed mechanism. The pinch roller 4 and the platen roller 6 are driven by a main motor 7. The printer also includes: a pinch roller lever 8 for contacting the pinch roller 4 with the capstan roller 5 and separating the pinch roller 4 from the capstan roller 5 in synchronization with the movement of a cam; a peel-off roller 9 for separating an ink film from a sheet of paper; a paper feed roller 10 for contacting the sheet of paper with the platen roller 6; a paper guide 11 for guiding the sheet of paper; a paper support 12 for housing a roll of paper; a cover frame 13 which is opened and closed by the engagement of a locking lever 14 with a locking lever shaft 15 and the disengagement of the locking lever from the locking level shaft, respectively, the cover frame 13 having a ribbon feed gear (not shown) for positioning the one end of a ribbon feed which is a roll of ink film as well as a ribbon feed presser 17 for pressing the other end of the ribbon feed; a head holder 18; a head 19 fixed to the head holder 18; a heat arm 20 which is moved in synchronization with the cam and to which the head holder is fixed; a cooling fan 21 for radiating the heat from the main motor 7 and the circuit section 2; an operation panel 22; a top cover 23; and an upper cabinet 24.

In such a heat transfer color printer, if a ribbon-shaped ink film wound in a roll is to be fed, it is required that a feed mechanism of the ink film incorporates a slipping mechanism from the viewpoint of the diameter of the roll or the feed speed thereof.

A known ribbon feed structure having a slipping function will be described below with reference to FIG. 2.

FIG. 2 is a schematic cross-sectional view of the ribbon feed mechanism of a thermal type printer. This thermal printer is of a heat transfer type which employs an ink film 32. After rolled out from a recording paper roll 29, a sheet of recording paper 30 is passed between a capstan roller 25 and a pinch roller 26. The sheet of recording paper 30 is pressed by these two rollers and is conveyed by the drive of the capstan roller 25 to a platen roller 27, at which it is brought into contact with the ink film 32. At this time, the sheet of recording paper 30 and the ink film 32 are pressed by a thermal head 28 and the platen roller 27.

The thermal head 28 serves to convert electrical signals to thermal signals, and these thermal signals are used to perform recording on a sheet of heat-sensitive paper (not shown). Alternatively, the thermal signals are used to heat transfer an ink of the ink film 32 onto the sheet of paper 30, so that characters or images are sequentially recorded on the sheet of recording paper 30 in accordance with the electrical signals. The sheet of recording paper 30 is then cut into predetermined lengths by a cutter 31, thereby completing recording. During this process, the ink film 32 is rolled out from an ink film roll 33 and is conveyed by a supply feed mechanism 34 and winding feed mechanism 35. The supply feed mechanism 34 and the winding feed mechanism 35 of the ink film in general are provided with a slipping mechanism because the sheet of recording paper 30 and the ink film 32 are often conveyed by the same motor (not shown) and because the diameter of the ink film roller 33 varies in accordance with the quantity of ink film which has been fed.

FIG. 3 shows an example of the slipping mechanism. A friction plate 43 is fixed to a ribbon feed component 40. A ribbon feed component 41 is mounted on the friction plate 43 in such a manner that it makes contact with the friction plate 43. A ribbon feed component 42 is placed on the ribbon feed component 41 through the intermediary of a spring 44 in such a manner that the ribbon feed component 42 and the ribbon feed component 41 are fixed to each other in the rotational direction, and is fixed to a shaft 46 through a C ring 45. More specifically, the ribbon feed component 40 and the ribbon feed components 41 and 42 are fixed to the shaft 46 in that order with the friction plate 43 being interposed between the ribbon feed component 40 and the ribbon feed component 41. A sliding friction generated between the ribbon feed components 41 and the friction plate is determined by the force imparted by the spring 44. In this case, a paper reel 47 mounted on the ribbon feed component 42 is driven by the ribbon feed component 40 which serves as a driving source. An ink film is wound around the paper reel 47.

In this known structure, a torque that rotates the paper reel 47 is determined by a state of the contact surfaces of the friction plate 43 and the ribbon feed component 41 and the force of the spring 44. In the friction generated at this time, however, there is a great difference between a static friction generated before the slide is started and a dynamic friction generated after the slide has been started. In consequence, the rotational torque is not made constant and is therefore unstable.

SUMMARY OF THE INVENTION

Thus, the known structure does not ensure a constant rotational torque, and it is therefore difficult to feed the ink film 32 at the same speed at which the sheet of recording paper 30 is fed. In particular, when this structure is applied to a color printer which requires matching of three primary colors of yellow, magenta, and cyan with high degree of accuracy, unmatching of these colors occurs. In view of these problems of the prior art, an object of the present invention is to provide a ribbon feed mechanism having a constant torque mechanism which has a simple structure and which ensures stable rotational torque.

DETAILED DESCRIPTION OF THE PREFERRED EMBODIMENTS

A ribbon feed mechanism according to the present invention includes first, second and third ribbon feed components mounted on a shaft, a friction plate mounted between the first and second ribbon feed components, a spring mounted between the second and third ribbon feed components, a cylinder which is in contact with the third ribbon feed component at one end thereof, a driving portion for applying a driving force to the first ribbon feed component, and a ribbon feed presser for pressing the other end of the cylinder toward the third ribbon feed component. In this structure, the second and third ribbon feed components are mechanically coupled to each other by the spring. The engaging surfaces of the second and third ribbon feed components are toothed. They are pressed by the spring in a state wherein a gap is partially formed between the engaging surfaces. The third or first ribbon feed component is driven by rotating the first or third ribbon feed component about the shaft. The friction generated between the first and third ribbon feed components can be kept constant to all intents and purposes.

Embodiments of the present invention will be described below.

Figure 1:
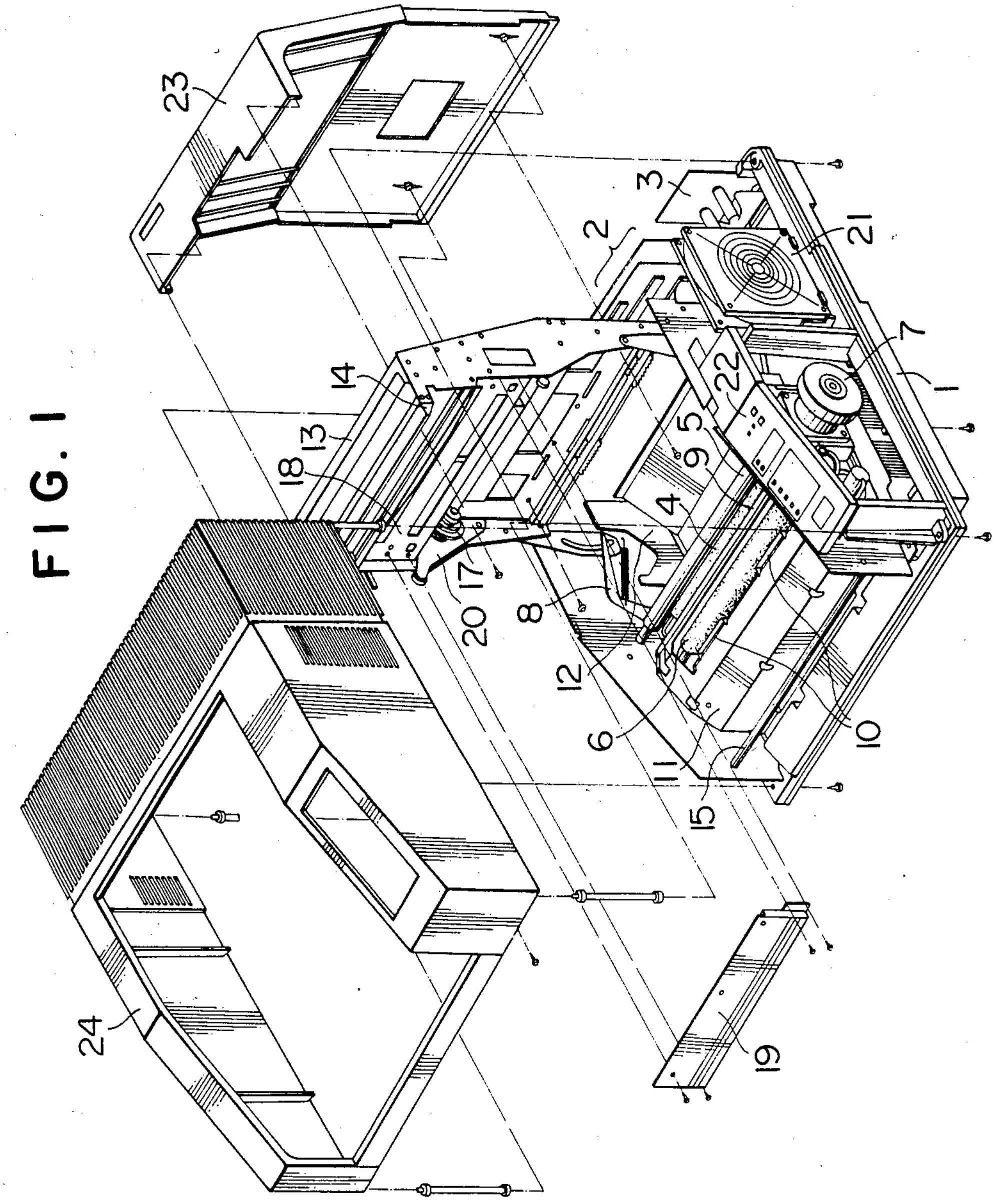
FIG. 1 is a perspective view of a heat transfer color printer.
Figure 2:
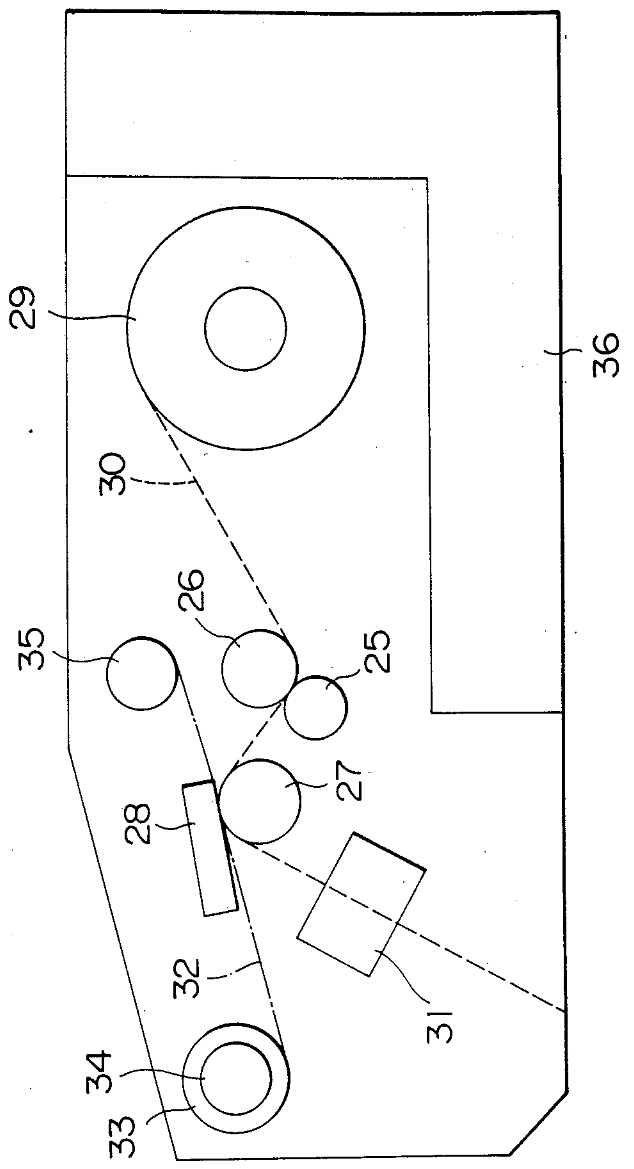
FIG. 2 is a schematic view of a thermal type printer.
Figure 3:
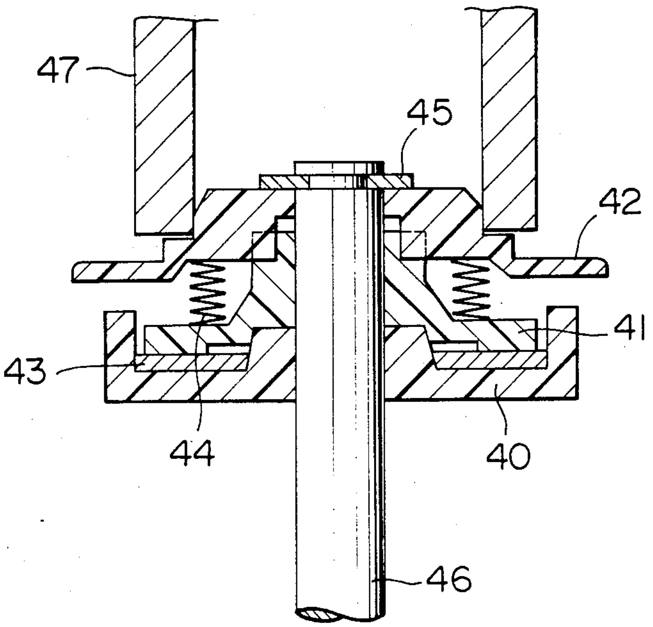
FIG. 3 PRIOR ART
FIG. 3 is a cross-sectional view of part of a known slipping mechanism.
Figure 4A:
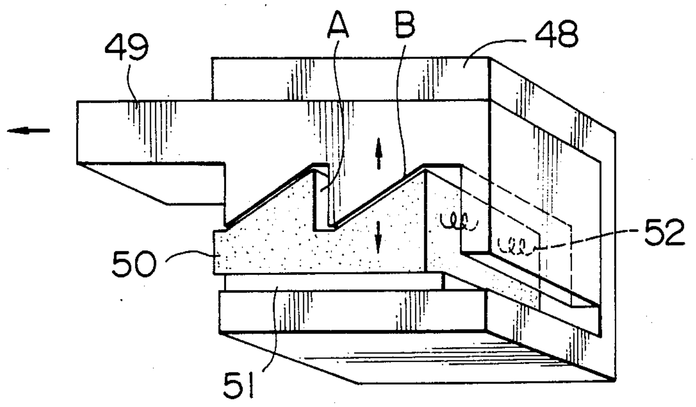
FIG. 4*a* illustrates the principle on which the present invention is based.
Figure 4B:
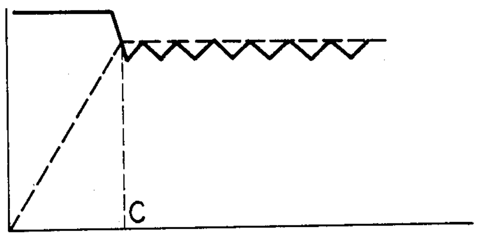
FIGS. 4*b* and 4*c* illustrate the relationship between the friction generated and the moved distance.
Figure 4C:
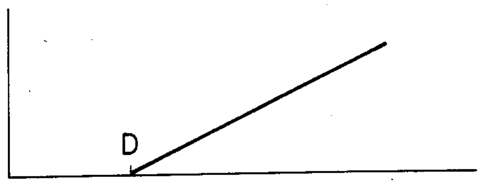

FIG. 4*a* illustrates the operational principle on which the present invention is based, and FIGS. 4*b* and 4*c* show the relationship between the friction and the moved distance.

The principle of the operation will be first described with reference to FIG. 4*a*.

A driving portion 49 is fitted in a U-shaped base 48 in a state wherein a friction can be ignored. A sliding portion 50 is provided within the base 48 through the intermediary of a friction plate 51 fixed to the base 48 in such a manner that its toothed surface is engaged with that of the driving portion 49. A spring 52 is provided between the driving portion 49 and the sliding portion 50 so as to urge the two components by a given force in the sliding direction of the driving portion 49. The toothed contact surfaces therefore receive the vertical force which acts thereto in the manner indicated by the arrows, so that a friction force is generated between the friction plate 51 and the sliding portion 50.

When the driving portion 49 is to be moved in the direction indicated by the arrow shown at the left of FIG. 4*a* from this state while it is fixed to the base 48, a friction force shown by the solid line in FIG. 4*b* is generated between the sliding portion 50 and the friction plate 51 if a tension indicated by the broken line in FIG. 4*b* is applied to the driving portion 49. The tension applied to the driving portion 49 is gradually increased. As it exceeds the spring force of the spring 52, the spring 52 contracts instantaneously. At this time, since there is a gap A between the toothed engaging surfaces, the driving portion 49 slightly moves leftward, i.e., in the direction which ensures that a gap is formed between the toothed contact surfaces B, as shown in FIG. 4*a*. As a result, the pressure applied to the toothed contact surfaces in the manner indicated by the arrows in FIG. 4*a* decreases. Thereafter, the spring 52 restores its force. As it restores a certain force, an original friction force is restored. This process is repeated in a short period of time, so that the friction is made constant to all intents and purposes.

A point C in FIG. 4*c* at which the tension becomes identical with the friction force corresponds to a point D in FIG. 4*c* at which the sliding portion 50 starts to move. After this point, if the constant tension is kept applied to the driving portion 49, the sliding portion 50 continues to move by the same distance as that of the driving portion 49. This is because, if the driving portion moves in the direction in which a gap is formed between the toothed contact surfaces B of FIG. 4*a*, the sliding portion 50 immediately follows the movement of the driving portion and moves in the direction in which that gap is reduced. The difference between the static friction and the dynamic friction is reduced by the force acting in such a manner that the friction force is reduced when the sliding portion 50 starts to move, so as to ensure smooth starting of the rotation. Further, a constant torque can be set by the spring 52 and the angle of the inclination of the toothed contact surfaces B, thereby providing stable slipping torque.

The relationship between the above-described principle and one embodiment of this invention will be described below with reference to FIG. 5 which is a cross-sectional view of a ribbon feed mechanism and FIGS. 6*a* and 6*b* which are exploded perspective veiws of a fixed torque device. The base 48, the driving portion 49, the sliding portion 50, the friction plate 51, and the spring 52 of FIG. 4*a* correspond to a ribbon feed component 53, a ribbon feed component 54, a ribbon feed component 55, a friction plate 56, a spring 57 of FIGS. 5 and 6, respectively. The toothed portion of FIG. 4*a* corresponds to toothed surfaces 58 and 59 of FIG. 6*a*. FIG. 6*b* is an enlarged view of the ribbon feed component 54.

Figure 5:
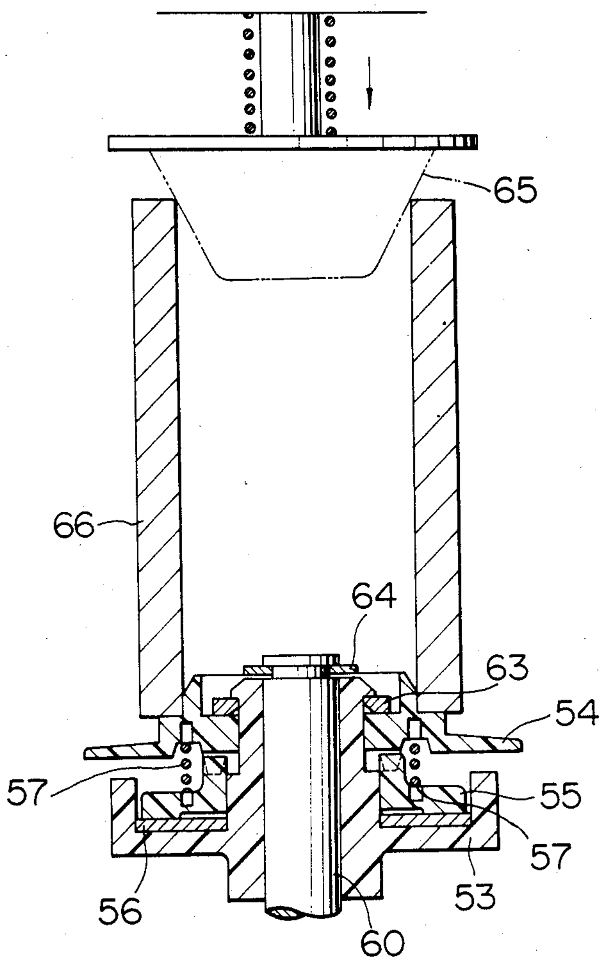
FIG. 5 is a cross-sectional view of one embodiment of the present invention.
Figure 6A:
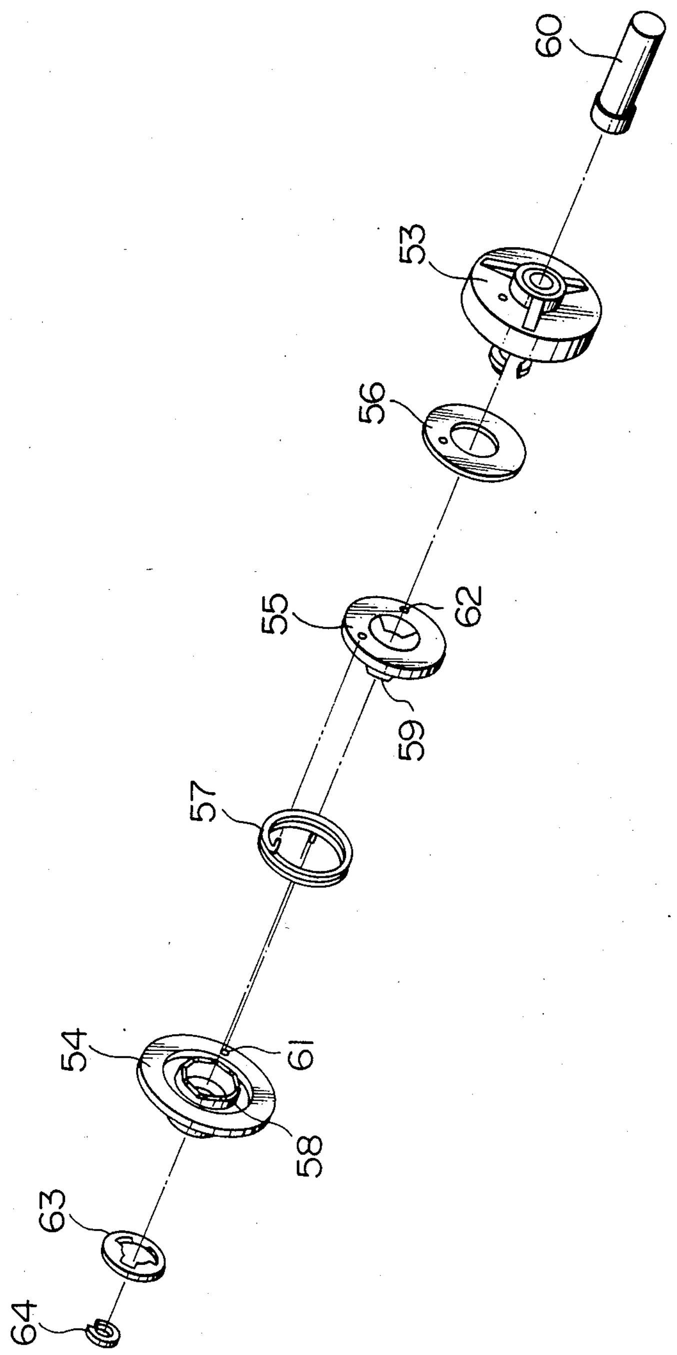
FIG. 6*a* is an exploded perspective view of the essential part of FIG. 5.
Figure 6B:
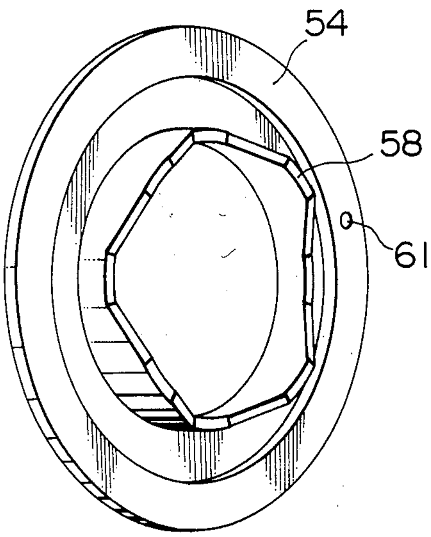
FIG. 6*b* is an enlarged view of a ribbon feed component.

As is seen in FIG. 5, the ribbon feed component 53 is fitted on the shaft 60, to which the friction plate 56 (having a doughnut-like shape) is fixed. Next, the ribbon feed component 55 is fitted on the shaft 60 in a state where its toothed surface 59 is directed upward so that the surface thereof which is not toothed makes contact with the friction plate 56. This surface which is in contact with the friction plate determines the friction. Next, the ribbon feed component 54 is fitted on the shaft 60, after is inserted on the latter in a state wherein its toothed surface 58 is directed downward so that it makes contact with the toothed surface 59. The spring 57 is made of a coil spring whose two ends are inserted into spring fixing holes 61 and 62 formed in the ribbon feed components 54, 55, respectively as clearly shown in FIG. 60. These two ends are arranged such that the shaft 60 passes through the spring 57 at the center of the coil when they are received in the holes 61, 62. Finally, these components are fixed by a washer 63 and a C ring 64. A ribbon feed presser 65 is pressed against a spool 66 which is set on the ribbon feed component 54.

The thus-arranged ribbon feed mechanism is operated in the manner described below.

When the ribbon feed component 53 is rotated by a motor, the pressure is caused to vary between the inclined surfaces formed by the toothed contacted surfaces of the ribbon feed components 55 and 54 on the basis of the principle described with reference to FIGS. 4*a*, 4*b* and 4*c* so that the force which drives the ink film (not shown) provided on the paper reel 66 through the ribbon feed component 54 acts in such a manner that the friction force between the ribbon feed component 55 and the friction plate 56 is reduced. When this driving force exceeds the friction force, slipping occurs, and the ink film is fed at a fixed torque. More specifically, when a torque that feeds the ink film becomes larger than the torque set by the ribbon feed mechanism, slipping occurs, and the ink film is not fed. When the first mentioned torque is smaller than the second mentioned torque, the ink film is conveyed at a fixed torque at which the ribbon feed mechanism has been set. This embodiment differs from the device shown in FIG. 4*a* since the coil spring is arranged in a different manner: the circumferential direction of the spring 57 employed in this embodiment coincides with rotational direction of the ribbon feed mechanism with both ends of the spring 57 being fitted in the holes 61, 62 formed in the components 54, 55. It therefore acts as an element which transmits the drive force in the rotational direction which corresponds to the sliding direction shown in FIG. 4*a*, and the spring force thereof can be set by the twisting angle formed between the ribbon feed components 55 and 54.

The friction plate 56 of this embodiment may be made of a cork or a cork containing rubber. A friction plate made of cork containing rubber has advantages in that it does not cause problems involving stick-slip and locking that might occur under high humidity. More specifically, since the cork containing rubber has a hardness of 80 to 90 Hs, the coefficient of friction obtained when the pressure is applied is small and its fluctuation is also small, preventing occurrence of stick-slip. The cork containing rubber contains smaller amount of air than the conventional cork, and therefore has a low water absorption. This property of the material enables locking that might occur when the friction plate 56 absorbs water under high humidity and swells to be prevented.

Thus, it is possible to stabilize the rotational torque of a ribbon feed mechanism with the use of arrangement according to the present embodiment. In particular, it is possible to make the rotational torque constant which might otherwise be large until the mechanism starts to move due to large static friction and become suddenly small owing to sudden reduction in the friction that takes place at the time when the mechanism starts to move.

Further, the present embodiment employs a coil spring for pressing the component against the friction plate whose circumferential direction coincides with the rotational direction of the ribbon feed mechanism and whose axis coincides with that of the ribbon feed mechanism. It is therefore possible to adjust the spring force easily by changing the twisting angle of the spring.

A second embodiment of the present invention will be now described. If the ribbon feed pressing is not made uniform, an ink film may be wrinkled while it is being wound, even if the constant torque mechanism according to the present invention which constitutes the first embodiment is employed. The present embodiment is directed to obviating this problem.

Figure 7:
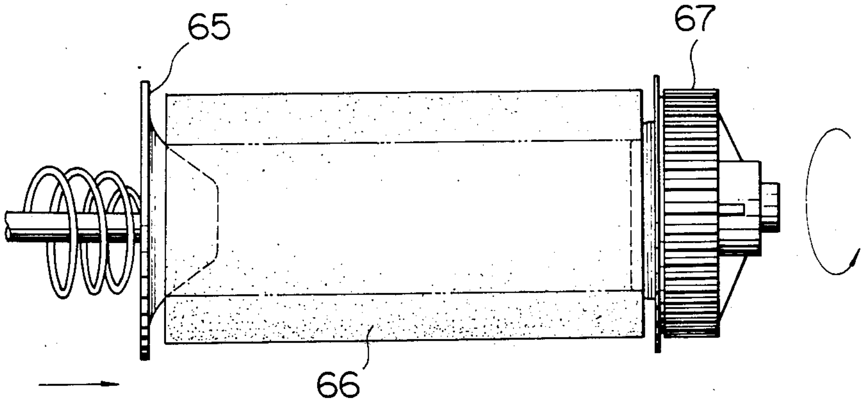
FIG. 7 is a side elevational view of a ribbon feed mechanism, showing another embodiment of the present invention.

Referring to FIG. 7 which shows the ribbon feed pressing portion of a heat transfer printer, a spool 66 is supported by a ribbon feed gear 67 and a conical or tapered ribbon feed presser 65. Therefore, even if the spool 66 swells by absorbing moisture or by being thermally expanded, backlash is absorbed by the tapered portion of the ribbon feed presser 65.

Even if the paper reel 66 is not positioned coaxially with respect to the ribbon feed gear 67 and the tapered ribbon feed presser 65, the end of the spool 66 which is closer to the tapered ribbon feed presser is corrected in position at the most stable portion on the tapered portion of the ribbon feed presser 65 during the feeding of the ink film, thereby enabling the spool 66 to be positioned coaxially with respect to the ribbon feed gear 67 and the ribbon feed presser 65.

In this embodiment, the ribbon feed presser 65 is tapered. However, the ribbon feed gear 67 may be tapered in place of the ribbon feed presser 65. Alternatively, both of the ribbon feed presser 65 and the ribbon feed gear 67 may be tapered. Whereas the spool 66 is made of paper in this embodiment, it may be made of a plastic or a metal.

Thus, it is possible, according to the present embodiment, to prevent occurrence of backlash of ribbon feed and of wrinkling of the ink film which results from the occurrence of backlash so as to provide a heat transfer printer which ensure a high quality of printing.

A third embodiment will be described below.

Normal feed of the ink film is impossible unless the spool is set in place on the supply or winding side. The measure taken against this situation will be described below with reference to FIGS. 8 and 9.

Figure 8:
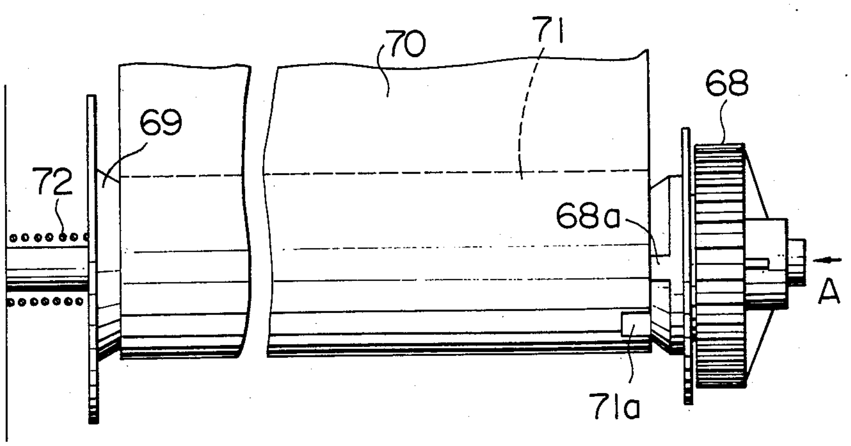
FIGS. 8 and 9 are side-elevational views of a film feed device, showing still another embodiment of the present invention.

FIG. 8 shows an ink film winding mechanism. This mechanism includes an ink film winding device 68, an ink film winding device 69, an ink film 70, an ink film winding side spool 71, and a pressing spring 72. The thus-arranged ink film winding device is operated in the manner described below. If a force is applied to the ink film winding device 68 while a notch 71*a* of the ink film winding side spool 71 is being disengaged with a projection 68*a* of the ink film winding device 68, so as to rotate the ink film winding device 68 counterclockwise as viewed from the direction indicated by the arrow A, the ink film winding side spool 71 is fixed by the back tension of the ink film 70. Therefore, the notch 71*a* of the ink film winding side spool 71 becomes aligned with the projection 68*a*, and the projection 68*a* enters the notch 71*a* by the force of the pressing spring 72. As a result, the rotational force is transmitted to the ink film rolling side spool 71 and winding of the ink film is thereby started.

Figure 9:
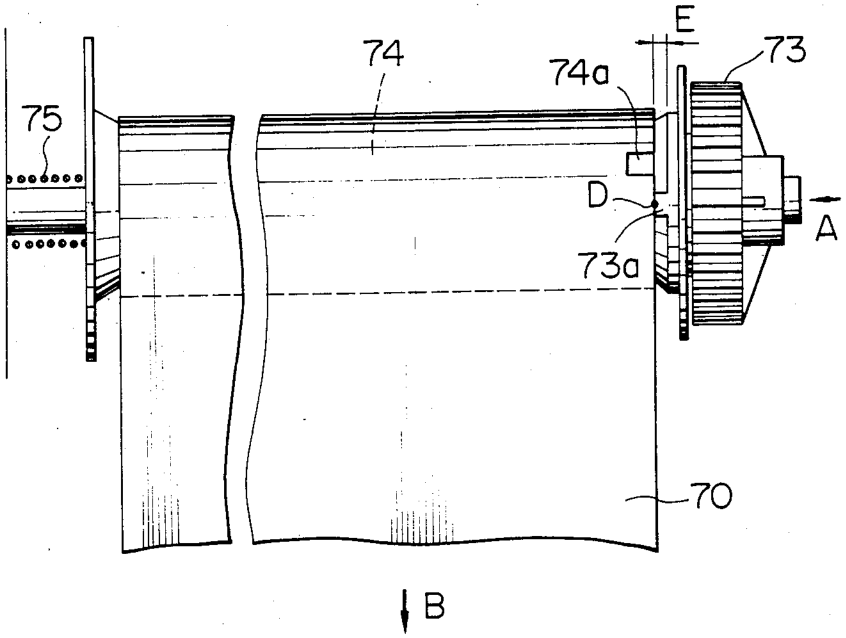

On the other hand, an ink film sending side device 73 is provided with a suitable mechanism for supplying a torque for a back tension, as shown in FIG. 9. Therefore, after the winding is started in the direction indicated by the arrow B, the ink film sending side device 73 does not rotate counterclockwise as viewed from the direction indicated by the arrow C, and a projection 73*a* of the ink film sending side device 73 is caused to slide against an end face D of the ink film sending side spool 74 until a notch 74*a* of the ink film sending side spool 74 becomes engaged with the projection 73*a*. After the engagement, winding of the ink film is continued until the initial marker of the ink film is detected. In this case, if the projection 73 is too high, the pressing force of the pressing spring 75 becomes increased, generating a large friction between the end face D of the ink film sending side device 73 and the projection. In consequence, sliding does not occur, and the ink film sending side device 73 is rotated. On the other hand, if the projection 73*a* is too low, the engagement thereof with the notch 74*a* becomes unstable, causing supply of a stable back tension to be impossible. Accordingly, in this embodiment, the height E of the projection 73*a* is set to one half of that of the projection 68*a* of the ink film winding side device 68 so as to reduce the pressing force of the pressing spring 75 and thereby solve the above-described problem. In this case, the projection 68*a* at the winding side is high. Therefore, it can be sufficiently fitted in the notch 71*a*, and possibility of the notch 71*a* of the paper reel 71 becoming crushed is eliminated. The high projection 68*a* increases the friction generated at an end face D. However, the winding force is at about 1,350 g, which is far larger than that of the sending force (about 250 g) and is large enough to overcome the friction.

Thus, in this embodiment, the projection on the ink film winding device and the ink film sending side device can be automatically engaged with the notches in the winding side paper reel and the sending side paper reel, respectively, when the ink film is replaced, so as to prevent erroneous sending of the ink film.

As will be understood from the foregoing description, it is possible to stabilize the rotational torque of the ribbon feed mechanism according to the present invention. In particular, it is possible to make the rotational torque constant which might be otherwise large before the movement of the mechanism is started due to large static friction and become small suddenly after it has been moved due to sudden reduction in the friction.

What is claimed is:

1. A ribbon feed mechanism comprising: first, second and third ribbon feed components fitted on a shaft, a friction plate mounted between said first and second ribbon feed components, a spring mounted between said second and third ribbon feed components, a cylinder which is in contact with said third ribbon feed component at one end thereof, and a ribbon feed presser for pressing the other end of said cylinder toward said third ribbon feed component, wherein said second and third ribbon feed components are mechanically coupled to each other by said spring, the engaging surfaces of said second and third ribbon feed components are toothed, said second and third ribbon feed components are pressed by said spring in a state in which a gap is partially provided between said engaging surfaces, and said third or first ribbon feed component is driven by rotating said first or third ribbon feed component about said shaft.

2. A ribbon feed mechanism according to claim 1, wherein said ribbon feed presser is tapered toward said other end of said cylinder.

3. A ribbon feed mechanism according to claim 1, wherein said friction plate is made of çork containing rubber.

4. A ribbon feed mechanism according to claim 1, wherein said spring is comprised of a coil spring having coils the circumferential direction of which coincides with the rotational direction of said first, second and third ribbon feed components, and the two ends of said coil spring being respectively mounted on said second and third ribbon feed components.

5. A ribbon feed mechanism comprising: first, second and third ribbon feed components fitted on a shaft, a friction plate mounted between said first and second ribbon feed components, a spring mounted between said second and third ribbon feed components, a cylinder which is in contact with said third ribbon feed component at one end thereof, a driving portion for applying a driving force to said first ribbon feed component, and a ribbon feed presser for pressing the other end of said cylinder toward said third ribbon feed component, wherein said second and third feed components are mechanically coupled to each other by said spring, the engaging surfaces of said second and third ribbon feed components are toothed, said second and third ribbon feed components are pressed by said spring in a state in which gap is partially provided between said engaging surfaces, and said third ribbon feed component is driven by rotating said first ribbon feed component about said shaft.

6. A ribbon feed mechanism according to claim 5, wherein said ribbon feed presser is tapered toward said other end of said cylinder.

7. A ribbon feed mechanism according to claim 5, wherein said friction plate is made of cork containing rubber.

8. A ribbon feed mechanism according to claim 5, wherein said spring is comprised of a coil spring having coils the circumferential direction of which coincides with the rotational direction of said first, second and third ribbon feed components, and the two ends of said coil spring are respectively mounted on said second and third ribbon feed components.

9. A film feed device comprising an ink film winding device having a first projection that engages with a notch in a winding cylinder on which an ink film is rolled up, and an ink film sending device having a second projection that engages with a notch in a sending cylinder on which said ink film is rolled up, said second projection having a height lower than that of said first projection, each of said ink film winding device and said ink film sending device having first, second and third ribbon feed components fitted on a shaft, a friction plate mounted between said first and second ribbon feed components, a spring mounted between said second and third ribbon feed components, a cylinder which is in contact with said third ribbon feed component at one end thereof, and a ribbon feed presser for pressing the other end of said cylinder toward said third ribbon feed component.

* * * * *